| United States Patent [19] | [11] | 4,118,516 |
|---|---|---|
| Van Praag et al. | [45] | Oct. 3, 1978 |

[54] USE OF CARAMEL COLOR FOR AUGMENTING OR ENHANCING OR INTENSIFYING THE COLOR OF NATURAL RED DYESTUFFS

[75] Inventors: Michel Van Praag, Tilburg; Gerrit Duijf, Koog aan de Zaan, both of Netherlands

[73] Assignee: International Flavors & Fragrances Inc., New York, N.Y.

[21] Appl. No.: 800,885

[22] Filed: May 26, 1977

[51] Int. Cl.$^2$ .................. A23L 1/27; A23L 1/275
[52] U.S. Cl. .................. 426/96; 426/250; 426/540; 426/576
[58] Field of Search ............... 426/250, 540, 576, 425, 426/96

[56] References Cited

U.S. PATENT DOCUMENTS 2,841,499  7/1958  Grossi .................. 426/250

OTHER PUBLICATIONS

Black Cherry Color Blend, Meer Corp. Technical Information #P283 1976.
Meer Corp. Tech. Information Bulletin F-132, Natural Tomato Color Blend, 1976.
Meer Corp. Tech. Information Bulletin P-285, Natural Raspberry Color Blend, 1976.
Food Engineering, May 1977, pp 66-72, Natural Colors: What Works . . . What Doesn't.

*Primary Examiner*—Jeanette M. Hunter
*Attorney, Agent, or Firm*—Arthur L. Liberman; Franklin D. Wolffe; Harold Haidt

[57] ABSTRACT

A composition which is a natural red dyestuff composed of two ingredients:
  (i) A natural red purple dye such as an anthocyanin (e.g. red cabbage dye) or a betalaine (e.g. a red beet dye); and
  (ii) Caramel color.

The composition is stabilized with ascarbic acid and is useful in foodstuffs, chewing gum and medicinals.

4 Claims, 3 Drawing Figures

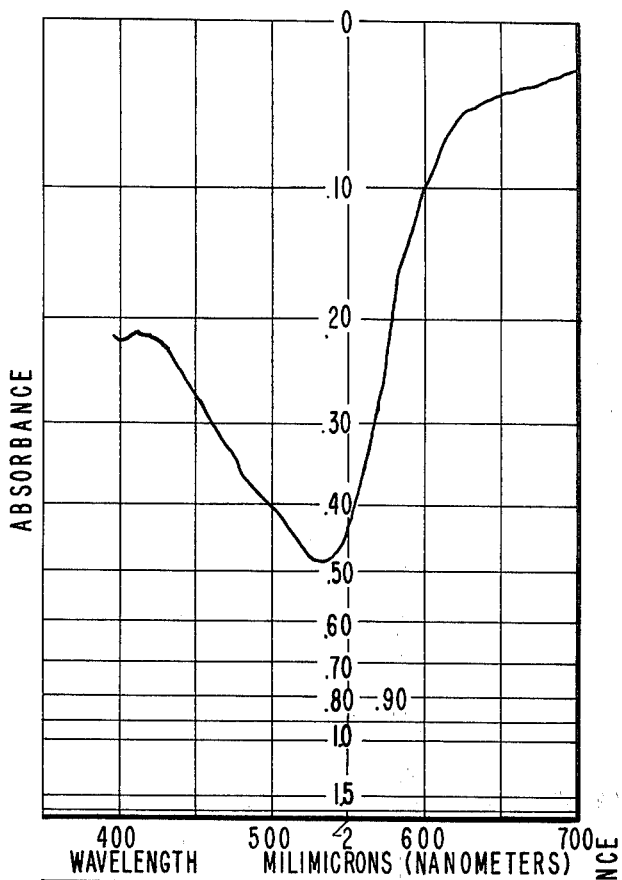
FIG.1 EXAMPLE IV, MIXTURE "A"
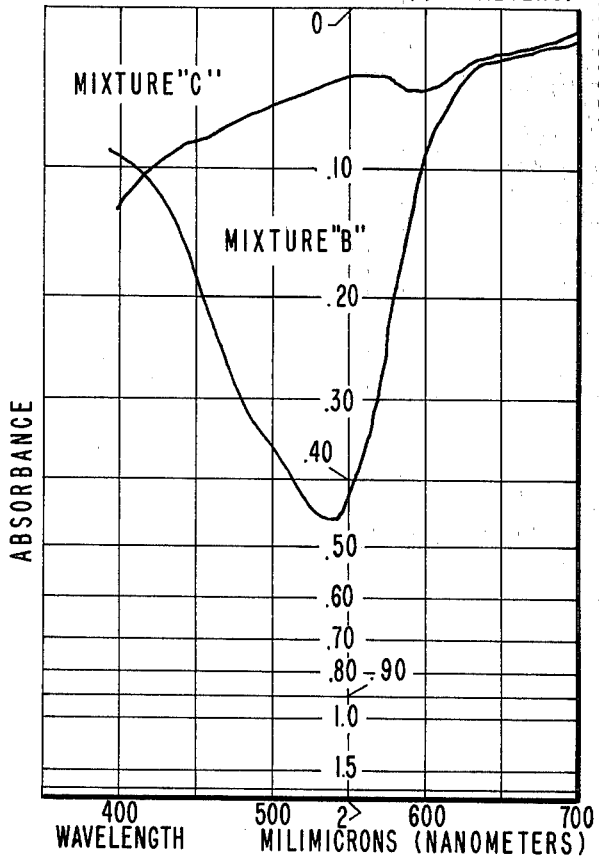
FIG.2 EXAMPLE IV, MIXTURES "B" AND "C"
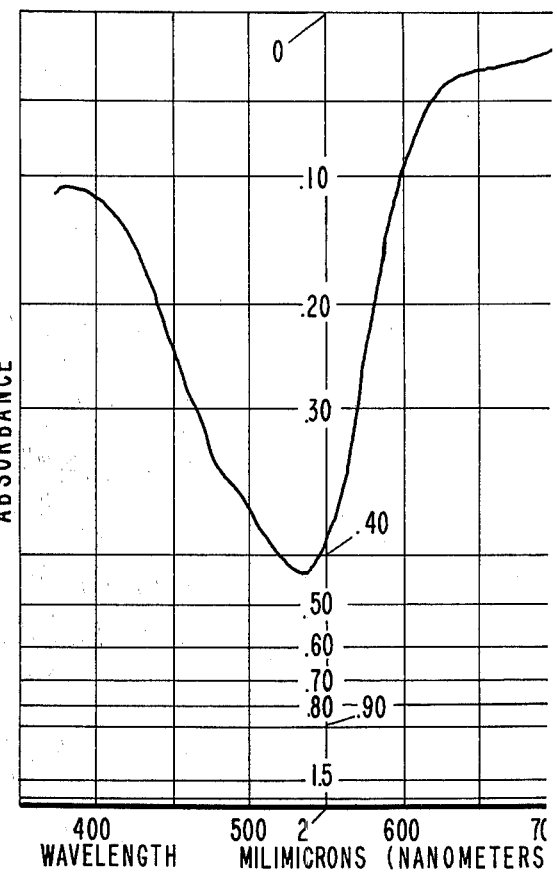
FIG.3 EXAMPLE IV, MIXTURE "D"

USE OF CARAMEL COLOR FOR AUGMENTING OR ENHANCING OR INTENSIFYING THE COLOR OF NATURAL RED DYESTUFFS

BACKGROUND OF THE INVENTION

Synthetic red dyestuffs such as F.D.&C. #2 and F.D.&C. #40 have heretofore been found to be unsuitable for use in conjunction with foodstuffs, e.g. ice creams and maraschino cherries. The present invention provides a natural red dyestuff composition having the same intensity and quality of red color as the heretofore-known synthetic red dyes; and with colorfastness and brightness comparable to the previously-known synthetic dyestuffs.

The use of combinations of caramel color and other dyestuffs has heretofore been disclosed in U.S. Pat. No. 2,841,499, issued on July 1, 1958. U.S. Pat. No. 2,841,499, provides a dry food composition comprising caramel color and/or a certified dye, e.g. amaranth F.D.&C. #2, which produces, on mixing with water, a product in which the color is indicated to be thoroughly and evenly distributed throughout the mass of the hydrated product. The object of U.S. Pat. No. 2,841,499 was to provide a method of coloring food products of the type which are sold as dry powders that are made ready for use by the addition of water, with the color being primarily provided by caramel coloring. The ratio of the caramel color to other certified dyes as disclosed in the Examples of U.S. Pat. No. 2,841,499 is shown to be about 80:1. U.S. Pat. No. 2,841,499 does not provide a composition or method for augmenting or enhancing or intensifying the red color of a natural red dyestuff, however.

Natural red dyestuffs and methods for extracting same from plants are well documented in the Prior Art as follows:

(i) Pages 45, 175 and 176 of the text —Nature's Colors: Dyes From Plants" Grae, MacMillan Publishing Company (1974).

(ii) Pages 70, and 85 of the book "Dye Plants and Dyeing-A Hand Book" (Special Printing of "Plants and Gardens" Volume 20, #3, 1964 (Brooklyn Botanic Garden).

(iii) U.S. Pat. No. 207,271, issued on Aug. 20, 1878 (Title: "Improvement in Processes of Treating Beet Roots for the Manufacture of Sugar").

(iv) U.S. Pat. No. 2,567,362, issued on Sept. 11, 1951 (Title: "Method of Extracting Pigments from Plants").

(v) U.S. Pat. No. 2,799,588, issued on July 16, 1957 (Process for the Production of Color Bodies from Fresh Vegetables).

As specified in "Natural Coloring Matters", Mayer, ACS Monograph, 1943, the pigment of red cabbage (Brassica oleracea) is the anthocyanin derivative, rubrobrassicin. As stated in Kirk and Othmer, Encyclopedia of Chemical Technology, Second Edition, Volume 10, Page 7, anthocyanins are used in foods as natural coloring matters. The nature of the extraction processes is further disclosed in Hayashi's Chapter on Anthocyanins in "The Chemistry of Flavanoid Compounds", Geissman, The MacMillan Company, 1962, pages 252-255. Recent developments concerning the chemistry and stability of anthocyanins is also disclosed in a paper delivered by F. J. Francis at the March 1977 American Chemical Society Symposium at New Orleans, La.

U.S. Pat. No. 1,243,042, issued on Oct. 16, 1917 covers the production of dyestuffs by extracting coloring materials of banana class plant substances.

Von Georgievics, "Chemisty of Dyestuffs", Scott, Greenwood and Company, London, 1903, at pages 361-386 (Dyestuffs of Vegetable Origin) sets forth various vegetable dyes and methods for producing same.

Betanine, the red beet dye having the emperical formula $C_{24}H_{26}O_{13}N_2$, is a betalaine which although being a red dye, forms a glistening bronze green crystal which may be degraded to glucose and Betanidine hydrochloride, $C_{18}H_{17}O_8NCl$, an amorphous purple material with a green sheen which is very sensitive towards oxygen. Its appearance is described on page 232 of the Mayer Monograph "Natural Coloring Matters" ACS Monograph Series, 1943. Its chemical structure is set forth Mabry et al, Tetrahedron 23 3111 (1967). In addition, biosynthesis of betalaines is discussed by Dunkelblum et al, Helv. Chim. Acta, Vol. 55, Fasc. 2 (1972) 642.

Caramel color has been cited in the prior art as a coloring agent for food stuffs, thusly:

(i) U.S. Fat. No. 2,582,261, issued on Jan. 15, 1952 (Caramel Color Manufacture);

(ii) U.S. Pat. No. 3,318,703, issued on May 9, 1967 (Title: Methods of Producing Substitute for Truffles); (See particularly Column 2, Lines 34-37);

(iii) U.S. Pat. No. 2,651,576, issued on Sept. 8, 1953 (Title: Caramel Color Compositions).

Nothing in the aforementioned prior art suggests either explicitly or implicitly the instant invention.

THE INVENTION

Our invention relates to the addition of caramel color to natural red purple dyestuffs, such as red beet concentrates or red cabbage or other natural anthocyanin red dyestuffs to augment or enhance or intensify the red sheen thereof.

The term "beet" is intended herein to mean any of the various biennial plants of the chenopodiaceous family, genus beta including the red beet, the root of which contains the red violet and yellow naturally occurring pigments, beta cyanins and betaxanthins.

Production of red beet dyes as they are intended to be used herein is set forth in detail in the following publications:

(i) Food Research 25 (3) 429 (1960) (Peterson and Josalyn, "The Red Pigment of the Root of the Beet(beta vulgaris) as a Pyrrole Compound");

(ii) Journal of Food Science, Vol. 41, 78 (1976) Futher (Adams, et al, "Production of a Beta Cyanine Concentrate by Fermentation of Red Beet Juice with Candida Utilis").

Solutions of dyes produced in this manner, however, include in addition to the red coloration, a blue or violet sheen or hue which causes the solutions to be unacceptable for a number of food applications.

The novel coloring compositions of the present invention which, in solution, give rise to a red color without the aforestated blue or violet sheen or hue may be used for many purposes, but they are particularly useful for coloring food. Synthetic coal tar colors have been widely used for food coloring and, while satisfactory from both a color and a cost standpoint they have been determined to be unsuitable for use in foodstuffs in high concentrations. Thus, there has been a long need in the art for food coloring agents which have the coloring attributes of coal tar derivatives, but which are acceptable for use in conjunction with foodstuffs, chewing gums and medicinal products. The coloring compositions made in accordance with the present invention possess excellent food coloring properties and are inexpensive and non-toxic. By following the process of the present invention it is possible to prepare coloring compositions from naturally grown vegetables, e.g. the red beet and the red cabbage, which contain natural red pigments that are distinctive in color, rather stable and intense in color, and are aesthetically pleasing to the eye in view of the absence of the characteristic blue or violet sheen or hue with which red beet dye and red cabbage dye are commonly associated.

Thus, it is commonly known that there are present in certain vegetables, pigments which if extracted can be used to color other materials and, in particular other foods. The prior art food coloring compositions prepared from pigments extracted from normally grown vegetables such as the red beet are subject to several shortcomings. Many of these compositions change color or discolor during normal shelf life; others are expensive due in part to the fact that it is necessary to heat the compositions during preparation to improve the stability and solubility of the naturally occurring pigments; while others do not have sufficient coloring power for pracitcal economic use. The betalaine containing compositions of the present invention are subject to none of these deficiencies, provided that ascorbic acid is contained therein.

Natural color is commonly extracted from normally grown vegetables, e.g. the red beet and the red cabbage by means of s simple aqueous extraction process. The resulting product is commonly designated as an extract or juice concentrate of the vegetable. Depending on the solvents used, the technique employed in the extraction process and the quality of the raw material, the extract may contain a greater or lesser proportion of the coloring matter, essential oils and other constituents normally present in the vegetable such as the red beet. One property which is used to indicate the quality of an extract is a rating known as color units or color value, a value obtained spectophotometrically by using a spectrophotometer (or simple colorimeter) by measuring the effective transmission of monochromatic light through a liquid sample. A spectrophotometer contains a source of white light and an optical system capable of separating the light into any wave lenght of its spectrum. The effective transmission of monochromatic light through a liquid is obtained by interposing the liquid in the light path of the instrument whereby light of the selected wave lenght is passed through the liquid and strikes a photosensitive vacuum tube; the resultant electronic signal is amplified and displayed on an indicator, calibrated in percent transmittance or absorbance.

The liquid sample is prepared by weighing analytically 100 mg. of the extract into a 100 milliliter volumetric flask which is then brought up to volume by adding the proper amount of solvent (such as distilled water with red beet extract). The effective transmission of this liquid sample is determined by selecting light of a definite wave lenght depending on the nature of the extract of which the color value is being determined (e.g.) 535 millimicrons for beet) and standardizing the spectrophotometer against a reference liquid or "blank" corresponding to the solvent used to prepare the liquid sample. The spectrophotometer is adjusted to read 100% transmittance for the reference liquid; a measurement is then taken of the liquid sample and a value thus obtained (which represents the ratio of the two measurements) is the present transmittance of the liquid sample. The percent transmittance is expressed in color values using predetermined standards established in the trade.

The described method for determining the color values of extracts may also be used to determine the color values of the finished coloring solutions of the present invention.

In its broadest aspect the process of the present invention contemplates a coloring composition prepared from a mixture comprising (i) from about 2.5 up to about 15% by weight of a natural caramel color and (ii) from about 85% up to about 97.5% by weight of natural red dyestuff, e.g. red beet dye containing from about 55% up to about 77% by weight soluble solids, the remainder being water.

The coloring compositions of the present invention may also include a percentage of ascorbic acid approximately equivalent to the percentage of caramel color present in the material. The ascorbic acid protects the red color of the dyestuff composition.

After the coloring composition in liquid form is produced, it may be combined with one or more spray drying aids such as gum arabic and maltodextrins or the solution may be encapsulated by standard coascervation techniques in edible materials using gelatin. The resulting spray dried product may then be added to foodstuffs, chewing gums or medicinal products; or the resulting liquid composition may be added to foodstuffs, chewing gums or medicinal products in conjunction with other materials such as flavoring adjuvants.

The standards by which the coloring compositions of our invention are compared to those of the prior art are particularly described in the text: "Food Colorimetry: Theory and Application" by Francis and Clydesdale, The AVI Publishing Company, Inc. (1975).

BRIEF DESCRIPTION OF THE DRAWINGS

FIG. 1 represents a graph of absorbance versus wave length in milimicrons (nanometers) for mixture "A" (1 gram caramel color and 9 grams beet juice concentrate diluted to 1.0 grams per liter) of Table I of Example IV.

FIG. 2 represents a graph of absorbance versus wave length in millimicrons (nanometers) for mixture "B" (9 grams beet juice concentrated, diluted to 0.9 grams per liter) and mixture "C" (1 gram caramel color diluted to 0.1 grams per liter) in Table I of Example IV.

FIG. 3 represents a graph of absorbance versus wave length in millimicrons (nanometers) for mixture "D" (10 grams beet juice concentrated, diluted to 1.0 gram per liter) in Table I of Example IV.

The following examples are given to illustrate our invention. These examples are not intended to be limiting but are only intended to represent preferred embodiments of our invention. It will, of course, be appreciated that in practising these preferred embodiments of the process of the present invention it is not critical which of the premix solutions is prepared first.

EXAMPLE I

Red beet extract is prepared by extracting 500 kg. of ground red beets with 500 kg. of water. After separating the liquid from the solid phase, the aqueous extracts are concentrated to approximately 50 kg.

687 grams of red beet extract (soluble solids content 68%) is then intimately admixed with 34.35 grams of a commercially available caramel color designated as "Caramel MD". The resulting mixture is added to 2,000 grams of water and 1,100 grams of gum arabic. After homogenization, the entire mixture is spray dried on a "NIRO Atomizer" manufactured by the NIRO Atomizer Company of Copenhagen, Denmark (inlet temperature 380° F., outlet temperature 180° F.) to yield a powder having a red color quality equivalent to the color quality of red dye F.D.&C. #2. No blue or violet hue or sheen is observed in the liquid phase.

Substantially identical results are achieved when "Caramel MD" is replaced by any of the following caramel colors:

(i) B&C 145 Caramel Color (Tinctorial Power, $K_{0.56}$ (0.1% solution absorbance/cm at 560m$\mu$) 0.242, Hue Index, 4.79; specific gravity at 60° F., 1.3182; percent dry substance, 63.5; pH, 3.2) manufactured by Sethness Products Company of 444 Lake Shore Drive, Chicago, Illinois 60611.

(ii) Hi Acid Proof 150 Caramel Color (Tinctorial Power, $K_{0.56}$ (0.1% solution absorbance/cm at 560m$\mu$) 0.162, Hue Index, 4.47; specific gravity at 60° F., 1.3242; pH, 2.9; percent dry substance, 66.4) manufactured by Sethness Products Company.

(iii) Acid Proof 100 Caramel color (Tinctorial Power, $K_{0.56}$ (0.1% solution absorbance/cm at 560 m$\mu$) 0.109, Hue Index, 4.63; specific gravity at 60° F., 1.3182; pH, 2.9; percent dry substance, 63.5) manufactured by Sethness Products Company of Chicago, Illinois.

Other caramel color products that may be used are specifically described in Peck, "Caramel Color/Its Properties/And Its Uses", reprinted from "Food Engineering" March, 1955, McGraw-Hill Publishing Company, New York, N.Y.

EXAMPLE II 687 grams of beet extract (soluble solids content 68%) produced according to Example I is intimately admixed with 34.35 grams of "Caramel MD", 34.35 grams of ascorbic acid, 2,000 grams of water and 1,000 grams of Gum Arabic. The resulting mixture is spray dried in accordance with the procedure set forth in Example I. No blue or violet hue or sheen is observed in the liquid phase. Stability of the resulting powder is improved.

Substantially identical results are achieved when "Caramel MD" is replaced by any of the caramel colors listed in Example I, to wit:

(i) B&C 145 Caramel Color (Tinctorial Power, $K_{0.56}$ (0.1% solution absorbance/cm at 560m$\mu$) 0.242, Hue Index, 4.79; specific gravity at 60° F., 1.3182; percent dry substance, 63.5; pH, 3.2) manufactured by Sethness Products Company of 444 Lake Shore Drive, Chicago, Illinois 60611.

(ii) Hi Acid Proof 150 Caramel Color (Tinctorial Power, $K_{0.56}$ (0.1% solution absorbance/cm at 560m$\mu$) 0.162, Hue Index, 4.47; specific gravity at 60° F., 1.3242; pH, 2.9; percent dry substance, 66.4) manufactured by Sethness Products Company.

(iii) Acid Proof 100 Caramel Color (Tinctorial Power, $K_{0.56}$ (0.1% solution absorbance/cm at 560 m$\mu$) 0.109, Hue Index, 4.63; specific gravity at 60° F., 1.3182, pH, 2.9; percent dry substance, 63.5) manufactured by Sethness Products Company of Chicago, Illinois.

Other caramel color products that may be used are specifically described in Peck, "Caramel Color/Its Properties/And Its Uses", reprinted from "Food Engineering" March, 1955, McGraw-Hill Publishing Company, New York, N.Y.

EXAMPLE III

The liquid mixture of Example I is added to milk at the rate of 3 grams per liter and to yogurt at the rate of 3 grams per liter. Compared to using normal beet extract without the addition of caramel, the color rating of the food containing the dye produced with the caramel is redder in tint compared to when used without the caramel. The same result occurs using the product of Example II.

EXAMPLE IV

Absorbance of red beet juice, caramel color, and mixtures of beet juice and caramel at 535 nanometers millimicrons) is measured as set forth below using a Beckman Grating Spectrophotometer (Model DB-G) a scanning spectrophotometer at a wavelength of 400–700 millimicrons. This range is the range of incandescent light transmission. The beet juice concentrate used is 68% soluble solids, pH 4.30 with citric acid added. The caramel color is Acid Proof 75, manufactured by the Sethness Products Company. The results are set forth in the following Table I:

| MIXTURE & DILUTION | pH | ABSORBANCE AT 535 NANOMETERS | QUALITATIVE APPEARANCE |
|---|---|---|---|
| Mixture "A": 1 gram caramel color liquid and 9 grams beet juice concentrate diluted with distilled water to 1.0 grams per liter. | 4.30 | 0.485 | A red color but violet hue not present |
| Mixture "B": 9 grams beet juice concentrate, diluted with distilled water to 0.9 grams per liter. | 4.32 | 0.455 | A red color with violet hue present |
| Mixture "C": 1 gram caramel color diluted with distilled water to 0.1 grams per liter | 3.39 | 0.048 | A yellow color |
| Mixture "D": 10 grams beet juice concentrate, diluted with distilled ater to 1.0 grams per liter. | 4.32 | 0.530 | A red color with a violet hue present |

FIG. 1 represents a graph of absorbance versus wave length for mixture "A". FIG. 2 illustrates graphs of absorbance versus wave length for mixtures "B" and "C". FIG. 3 represents a graph of absorbance versus wave lenght for mixture "D".

The red beet juice concentrate is produced by Takasago Perfumery Co., Ltd, of Tokyo, Japan. It has the following specifications:

| "RED BEET JUICE CONCENTRATE SPECIFICATIONS | |
|---|---|
| 1. Appearance: | Red or dark red solution. |
| 2. Taste and flavor: | No off-taste and off-flavor, except for those originated from Red Beet Juice shall be observed. |
| 3. color Value: | Not less than E-Value 5.5. Weight accurately 100 mg of sample and dilute up to make 100 ml 20 distilled water. Measure - log T value of the prepared solution as a reference at the wave length of 532 m in 10 mm light path cells. |

Calculate $E^{1\%}_{1cm}$ by using the following equation.

$$\text{E-Value } (E^{1\%}_{1cm}) = \frac{-\log T}{\text{Weight of Sample}} \quad (9)$$

"RED BEET JUICE CONCENTRATE SPECIFICATIONS -continued

| | |
|---|---|
| 4. Hue: | Reads the whole range of visible spectrum absorbance by spectrophotometer for the determination of color value and also for the observation of hue. The visible spectrum of the aqueous solution of this sample shows max at or around 532 m, and almost does not give a peak around 480 m. |
| 5. Brix: | Not less than 70°. |
| 6. Heavy Metals: | less than 100 ppm (as Pb). |
| 7. Arsenic: | less than 2 ppm (as $As_2O_3$). |
| 8. Artifical Colors: | Not contained. |
| 9. Bacteria Logicality: | Total viable cells ..... less than 3,000/g. Molds and Yeasts ..... negative. Coliform Bacteria ..... negative. |
| 10. Foreign Materials: | Not contained. |
| 11. Other substances: | Any substances detrimental to human health should not contained." |

What is claimed is:

1. A composition having an enhanced red color without a blue or violet sheen comprising caramel color and a betalaine dye which is a red beet dye and, in addition, a stabilizing quantity of ascorbic acid, the said composition being an aqueous solution, said caramel color being in an amount of from 2.5 to 15% by weight of said solution.

2. A process for producing a dry dyestuff-containing additive for foodstuffs said dyestuff being a natural red beet dyestuff comprising the step of intimately admixing the composition of claim 1 with gelatin and coascervating the resulting mixture whereby encapsulated color particles are produced.

3. A process comprising the step of intimately admixing a colorless foodstuff with the composition of claim 1 whereby a foodstuff having a red color without a blue or violet sheen is obtained.

4. A process for producing a dry dyestuff adjuvant for foodstuffs, said dyestuff being a red beet natural dyestuff comprising the step of intimately admixing the composition of claim 1 with gum arabic and spray drying the resulting composition.

* * * * *